June 8, 1948. J. R. WILCOX 2,442,794
PLANTER AND PROCESS OF OPERATING THE SAME
Filed May 3, 1941 3 Sheets-Sheet 1
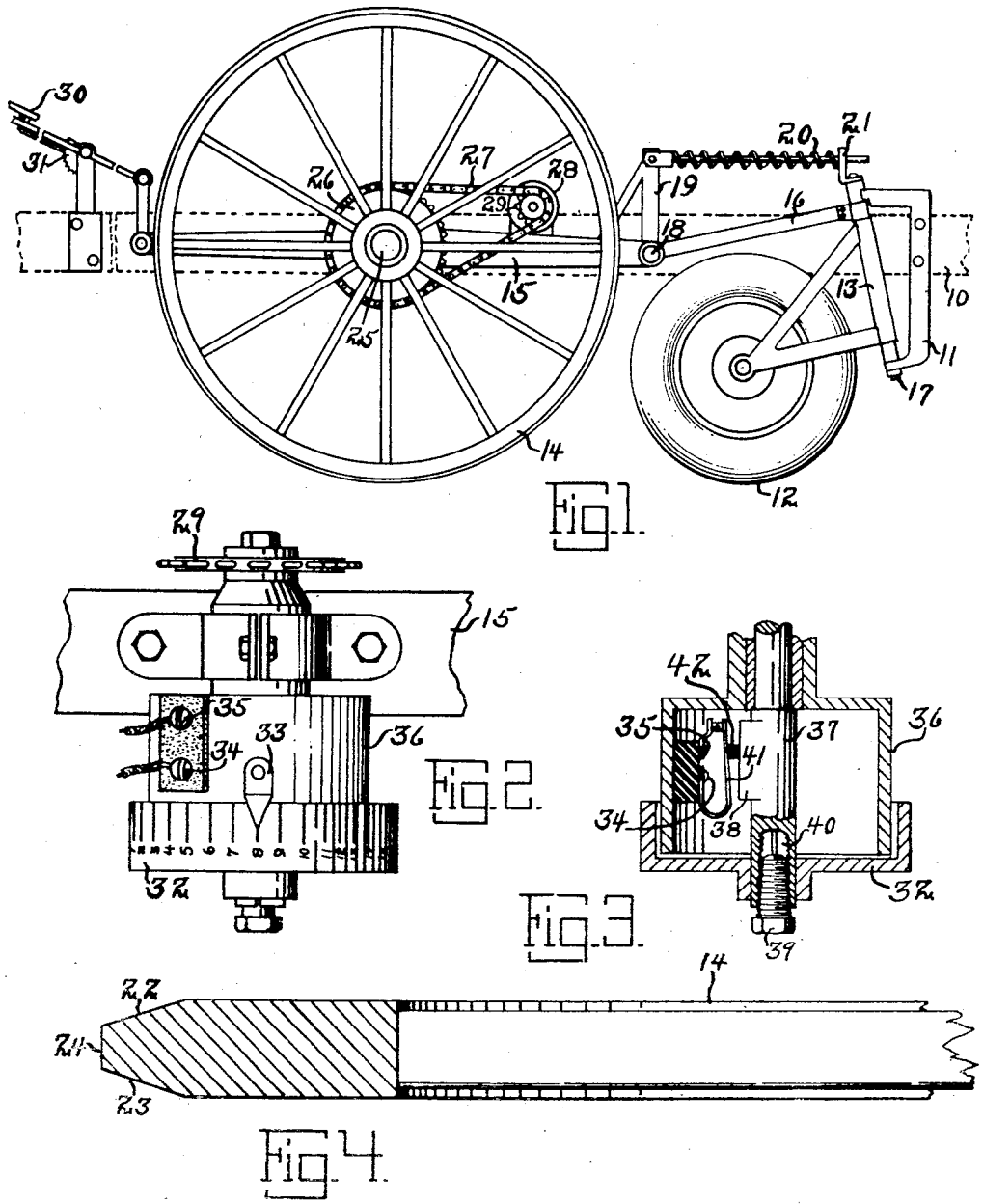
INVENTOR.
J. R. WILCOX
BY
Dick, Bailey & Fletcher

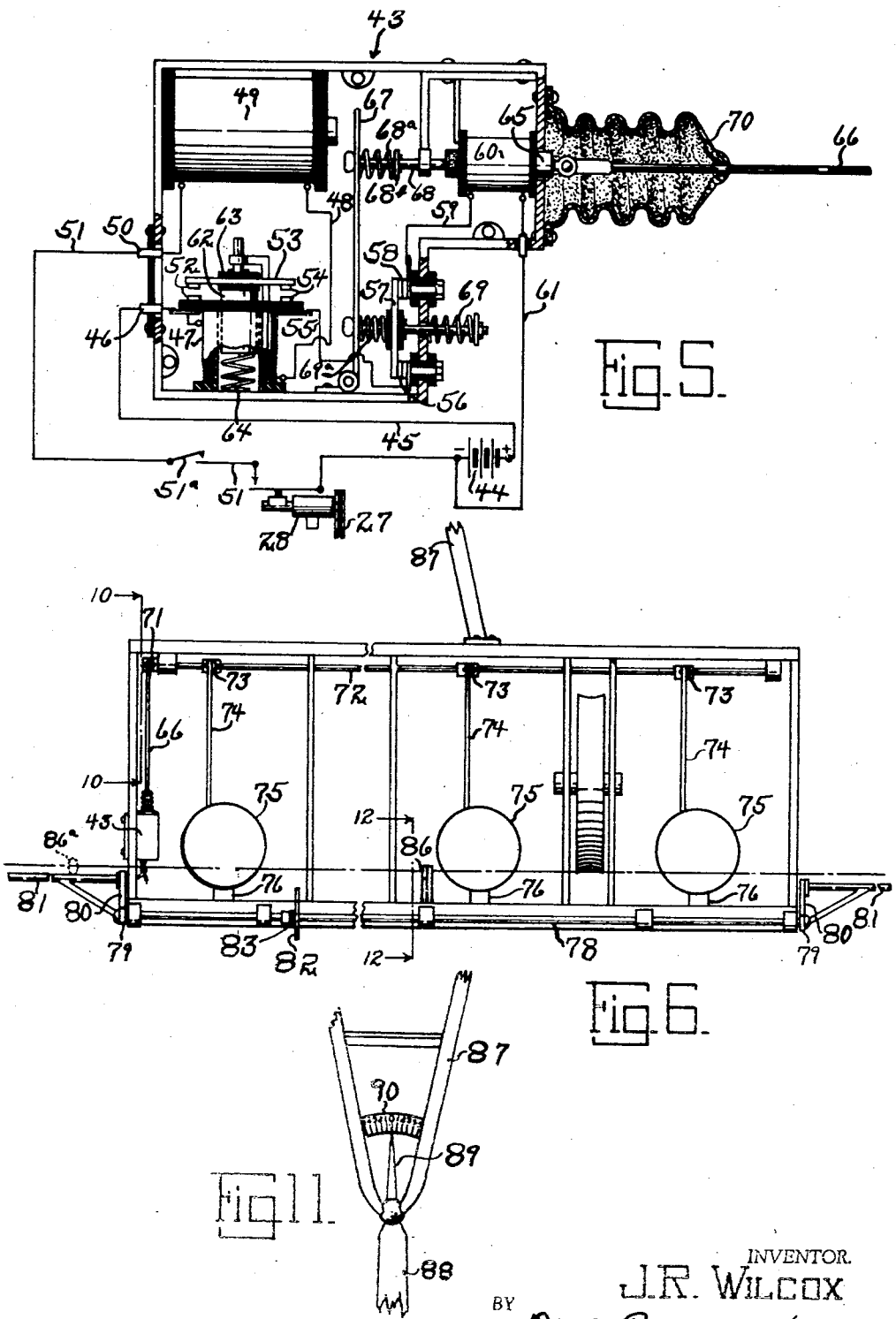

June 8, 1948.  J. R. WILCOX  2,442,794
PLANTER AND PROCESS OF OPERATING THE SAME
Filed May 3, 1941  3 Sheets-Sheet 3

INVENTOR.
J. R. WILCOX
BY
Dick, Bailey & Fletcher

Patented June 8, 1948

2,442,794

UNITED STATES PATENT OFFICE 2,442,794

PLANTER AND PROCESS OF OPERATING THE SAME

James Russell Wilcox, Jewell, Iowa, assignor of one-half to Clifton A. Furman, Jewell, Iowa Application May 3, 1941, Serial No. 391,726

24 Claims. (Cl. 111—16)

This invention relates to agricultural planters. More specifically, it relates to mechanism and process for actuating such a planter.

I shall describe my invention in connection with a corn planter. Obviously, however, it may be employed in conjunction with any type of planter or other intermittent dispensing machine.

The almost universal practice has been to operate corn planters by means of a long wire stretched across the field, which is being planted and having a multiplicity of knots or other enlarged sections spaced apart along the length of the wire at distances comparable to those desired between the hills of corn. The wire is threaded through the dropping mechanism of the planter and the knots or other enlargements as they pass through the dropping mechanism serve to actuate it to cause the dropping of the number of kernels of corn desired in one hill. Numerous obvious disadvantages are present in the wire type of planter. For one thing, the wire itself due to its bulkiness and semi-inflexibility is a nuisance. Again frequently the wire breaks or the stakes anchoring it become disengaged from the ground. Again substantial skill is required in operating a planter of the wire type in that experience is almost a pre-requisite for proper setting of the anchoring stakes for the wire in that it is essential that the wire be at a reasonably standard tension each time it is set. I have overcome the disadvantages of the wire type of planter and have provided a planter operated by a member engaging the earth rather than a wire.

It is an object of this invention to provide a planter capable of being operated without the use of an elongated wire extending across the field.

Another object of this invention is to provide a planter in which the operations of the dropping mechanism are at least in part controlled by an electric current.

Another object of this invention is to provide a novel process for operating the dropping mechanism of a planter.

Another object of this invention is to provide a novel process for determining the junctures at which the dropping mechanism will be actuated.

Yet another object of this invention is to provide a combination measuring and timing device for my planter.

Still another object of this invention is to provide a novel electrical unit for use in connection with the operating of the dropping mechanism of a planter.

Still a further object of this invention is to provide a plurality of cooperating indicating and control means for coordinating my planter mechanism.

Basically my planter mechanism comprises a comparatively freely mounted relatively large narrow rimmed wheel capable of rotating in contact with the ground and capable also of propelling an electrical timing device which intermittently completes an electrical circuit causing the dropping mechanism of the planter to function. In order that the said large wheel, which we shall refer to herein as the measuring wheel, may not skid or deviate in any manner from the constant frictional contact with the ground, a packing wheel is provided to revolve in engagement with the ground in front of said measuring wheel to form a packed track in which the measuring wheel may follow, especially due to its versatile mounting. When the timing device heretofore referred to completes the electrical circuit, a plurality of electromagnets are activated in a manner which shall hereafter be more fully pointed out, causing the dropping mechanism to be actuated. A number of gauges or dials and other indicating and control means are provided to enable properly co-ordinating the planting and measuring mechanisms as the occasion arises.

In order that a more clear and concise understanding of my invention may be had, reference should be had to the accompanying drawings forming a part of this specification, in which:

Fig. 1 is a side elevation of the measuring wheel, timing device, packing wheel, and certain connected members shown mounted on a tractor.

Fig. 2 is a plan view of the timing device.

Fig. 3 is a horizontal cross sectional view of the major part of the timing device.

Fig. 4 is a fragmentary transverse cross sectional view of the measuring wheel showing the contour of the portion of the rim which engages the ground.

Fig. 5 is a partially cross sectional view of the electrical control unit for operating the dropping mechanism in which certain of the connections and the like are shown schematically.

Fig. 6 is a plan view of a four-row planter embodying my invention in which a portion has been broken away in order to conserve space.

Fig. 11 is a plan view of the gauge and connected structure shown in Fig. 9.

Figure 7:
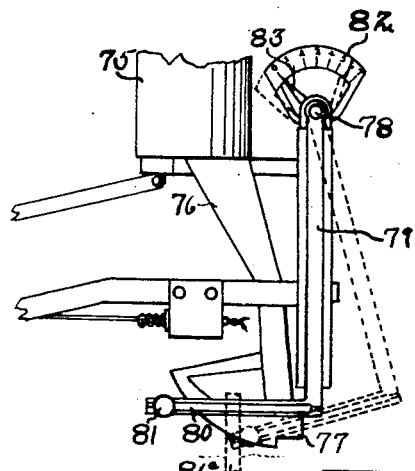
Fig. 7 is a side elevation of a portion of the planter shown in Fig. 6 disclosing one of the indicating and control gauges and certain attached structure, including an end view of one of the bumper bars used in setting my planter mechanism.
Figure 8:
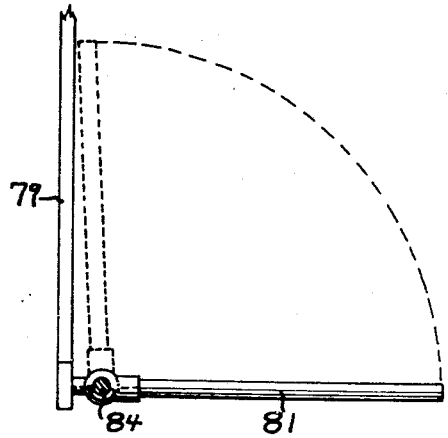
Fig. 8 is a front elevation of one of the bumper bars with the inactive position of the bar shown by dotted lines.
Figure 9:
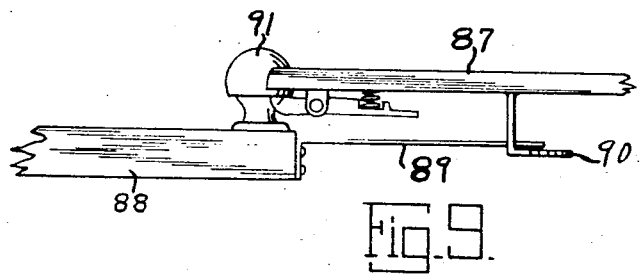
Fig. 9 is a side elevation of the coupling structure connecting a tractor draw-bar to the planter and includes another gauge device capable of showing the alignment between the tractor and the planter.
Figure 10:
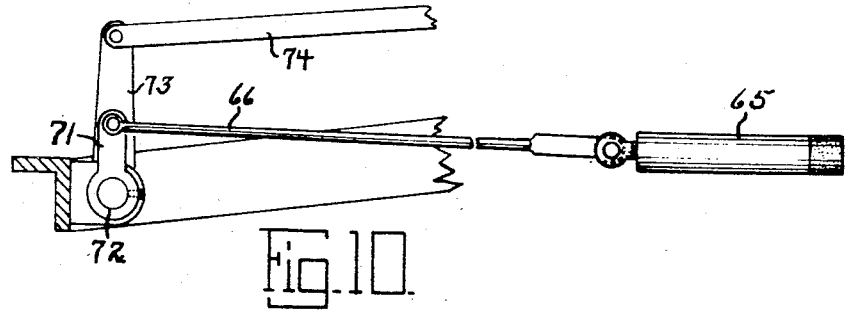
Fig. 10 is a partially cross sectional side view of a portion of my planter showing a part of the connecting rods which actuate the dropping mechanism and are themselves actuated by an electromagnet, the core of which is shown, the same being taken on line 10—10 of Fig. 6.
Figure 12:
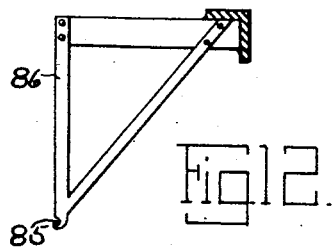
Fig. 12 is a fragmentary partially cross sectional view of the planter showing a hook and supporting structure employed in measuring in connection with the original setting of my planter mechanism, the same being taken on line 12—12 of Fig. 6 and rod 78 not being shown.

Referring now to the drawings in greater detail, the numeral 10 designates a support member designed to be mounted upon a tractor and designed to rigidly support the bracket 11 upon which the packing wheel 12 is rotatably and pivotally mounted by means of the hanger member 13. The measuring wheel 14 is also indirectly attached to the bracket 11 by means of the arm members 15 and 16 together with the pintle 17 upon which one end of the arm 16 is pivotally mounted. The pintle 17 is also the direct mounting for the hanger 13. The arm members 15 and 16 are hingedly connected at 18. In order that the measuring wheel 14 may be constantly held in intimate contact with the ground, the braced bracket 19 is provided on the arm 15 and a spring 20 is provided abutting against the lug 21, tending to rotate the arm member 15 downwardly around the pivot point 18. The packing wheel 12 is preferably provided with a tire having a central peripheral rib of the type commonly present on non-side-slip tractor tires. By reason of this central rib, a continuous narrow track is provided immediately in front of the measuring wheel 14. The outer rim of the measuring wheel 14 is inwardly beveled at 22 and 23 to provide a very narrow extreme outer portion 24 on the rim. By this construction, together with the flexible mounting of the measuring wheel 14 as heretofore described, the fact that the portion 24 of the rim of the measuring wheel 14 is always in engagement with the bottom of the track produced by the rib on the tire of the packing wheel 12 is insured. Any slight variation in alignment will be rectified by means of the bevels 22 and 23, which tend always, by engagement with the walls of the narrow track, to keep the portion 24 of the rim of the measuring wheel 14 in the central portion of said track. The measuring wheel 14 carries no substantial amount of weight and the tension of the spring 20 is not excessive, so the likelihood of slippage between the measuring wheel and the ground is substantially eliminated. The measuring wheel 14 is rotatably mounted upon the arm 15 at 25. Rigidly secured to the measuring wheel 14 is the sprocket wheel 26 which drives the chain 27, which in turn drives the timer 28, which is rigidly mounted upon the arm 15. As will hereafter more clearly appear, by proper selecting of the size of the sprocket wheel 26 and the size of the sprocket wheel 29 which drives the timer 28, the distance between the hills of corn may be regulated. The foot pedal 30 stationed within reach of the tractor operator and suitably connected to the measuring wheel 14 or its support provides means for raising the measuring wheel out of engagement with the ground when such action is desired. A catch mechanism 31 is provided for yieldably retaining the foot pedal 30 and hence the measuring wheel 14 in certain pre-determined positions. The timing device 28 includes, in addition to the sprocket wheel 29, a dial gauge 32, a pointer 33, electric binding posts 34 and 35, housing 36, a shaft 37 on which is a lobe or cam 38, an expansion screw 39 engaging a tapped and slotted hole 40 in the shaft 37, a suitably insulated hairpin type breaker point switch 41 and an insulating lug 42 on said hairpin switch capable of engaging said lobe 38 to close said switch 41. The sprocket wheel 29 and the dial 32 are mounted at opposite ends of the shaft 37 and rotate with said shaft. By loosening the expansion screw 39, the dial 32 may be rotated on the shaft 37 so that the pointer 33 may be caused to point to any desired position on the scale on said dial without rotating the shaft 37. When the expansion screw 39 is tightened, the dial 32 rotates with the shaft 37. Each full space on the scale of the dial 32 represents one inch on the outer periphery of the measuring wheel. The timer 28 is electrically connected to the electrical unit 43 which also is electrically connected to a suitable electrical source such for example as the battery 44. The electrical unit 43 contains two electrical circuits for which the lead wire 45 serves as a common wire. Following the current through one of these circuits, it leaves the positive side of the battery 44, travels through the lead wire 45, through the binding post 46 into the solenoid 47, out through the wire 48, through the electromagnet 49, out through the binding post 50, and thence through the wire 51 and the switch 51ª, which will later be mentioned, eventually back to the battery 44. In the other circuit, the current travels through the wire 45 and the binding post 46, through the contact points 52, which at times are brought together in a manner which will be later pointed out, through the breaker arm 53, through the breaker points 54, along the wire 55, through the breaker points 56, breaker arm 57, breaker points 58, and wire 59 to the electromagnet 60 from which it returns through the wire 61 to the battery 44. The timer 28 is connected into the circuit of the wire 51 by the binding posts 34 and 35. When the insulated lug 42, due to engagement with the lobe 38 on the shaft 37, closes the contact points of the switch 41, current passes through the first of the two circuits described activating the solenoid 47 and the electromagnet 49. The solenoid 47 is provided with a longitudinally slidable core 62 to which the breaker arm 53 is attached through insulation 63. A spring 64 is provided to maintain the core 62 in a removed position in the absence of other more powerful forces. As a result, the breaker points 52 and 54 are normally broken. However, when current is passing through the first mentioned circuit as heretofore described, magnetic forces in the solenoid 47 operate to draw the core 62 further within said solenoid 47 and hence to close the breaker points 52 and 54. When the breaker points 52 and 54 are closed by this action, current also passes through the second of the two circuits described, setting up magnetic forces in the electromagnet 60 which has a longitudinally slidable core 65 to the outer end of which is attached a connecting rod 66 capable of actuating the dropping mechanism of the planter. When magnetic forces are set up in the electromagnet 60, the core 65 is drawn further within the electromagnet 60, pulling the connecting rod 66 and causing the seed to drop. Inward movement of the core 65 forces the finger 67, by means of the pin 68 and spring 68ª abutting the washer 68ᵇ which is secured to said pin 68, into the magnetic field of the electromagnet 49 where the finger 67 is then retained until current ceases to flow in the first circuit. The pin 68 is, within limits, longitudinally slidable in the finger 67; thus the spring 68ª provides cushioning effect when the pin 68 returns into contact with the end of the core 65. As appears clearly in the drawing, the breaker arm 57 is mounted upon the finger 67 and cushioned therefrom by the spring 69ª. When the finger 67 is held adjacent the electromagnet 49, the breaker points 56 and 58 are broken, thus stopping the flow of current in the second circuit. The spring 69 serves to retain the finger 67 normally in a position spaced from the electromagnet 49. A suitable shield 70 is provided for preventing dirt and the like from getting into the electrical unit 43. By means of the combined operation of the electrical unit 43, current is permitted to pass through the second circuit for only a very short interval each time the dropping mechanism is actuated, a result most desirous in that if the dropping mechanism is not returned to a closed position substantially immediately, kernels of seed may be dropped at undesired points. The connecting rod 66 is pivotally connected to the arm 71 which is locked to the shaft 72 on which the arm 73 is locked. The arm 73 operates the connecting rod 74 which operates the dropping mechanism beneath the hopper 75, permitting the seed to fall downwardly through the closed channel 76 out through the shoe 77. On the planter, a rotatable rod 78 is provided on each end of which hanger arms 79 support connecting arms 80 which in turn support bumper bars 81. Also mounted on said rotatable rod 78 is a gauge 82 on the scale of which the distance in one full space represents one inch of movement by the bumper bars 81. A stationary pointer 83 serves to designate the reading on the gauge 82. The bumper bars 81 are pivotally mounted on the shafts 84 in order that they may be raised into vertical, out of the way, positions, as shown in dotted lines in Fig. 8, when traveling across the field. A hook 85 suspended by the hanger 86 is so situated on the planter that its inner hook surface is substantially in horizontal line with the center line of the stake 86ª which the bumper bars 81 engage, when said bars 81 have just contacted said stake 86ª. The tongue or draw-bar structure 87 of the planter is preferably substantially V-shaped and engages the draw-bar 88 of the tractor at its apex. A pointer member 89 is attached to the rear end of the draw-bar 88 of the tractor and a scale 90 is provided between the arms of the V-shaped draw-bar 87 of the planter, whereby alignment between the planter and tractor is gauged. One full space variation from zero in the scale 90 indicates that the planter is one inch off of perfect alignment with the tractor. A suitable ball and socket connection 91 or other suitably versatile connecting structure may be provided for joining the draw-bar 87 of the planter to the draw-bar 88 of the tractor. Raising the planter shoes from the ground opens the switch 51ª preventing planting. In operating my planter structure, the first step after assembly and upon driving into the first field is to plant a few hills. One may travel half-way or more across the field. The operator then dismounts from the tractor and places a tape measure or other suitable measuring device on the hook 85 and measures back, say, three planted hills. He then divides this measurement in inches by the number of inches which the hills are supposed to be apart. This latter distance, as previously pointed out, may be controlled by the relative sizes of the sprocket wheels 26 and 29. His quotient will be two plus a number of inches left over if we assume that he measures back three hills. The operator then loosens screw 39 and adjusts the gauge 32 until the pointer registers with that number on the scale of the gauge 32 which corresponds to the number of inches left over in his quotient. He then tightens the expansion screw so that the gauge 32 is locked to the shaft 37. The purpose in measuring back a number of hills rather than simply measuring to the hill nearest the planter is that speed changes occur in the halting of the forward motion of the tractor and planter with the result that the "carry past," which occurs in any planter between the occurrence of the initial act in actuating the dropping mechanism and the final contact of the seed with the ground, is less at lower speeds. The measurement is therefore taken to a hill which was planted before the speed decrease began and in the computation the divisor is chosen as though no change in the amount of the "carry past" had occurred. Having once set the gauge 32 on the shaft 37, it is unnecessary to further alter this setting unless or until the usual speed of operation of the planter is changed. The remainder of the distance across the field is then covered. When the tractor is stopped at the end of the row, the operator dismounts, reads the gauge 32 on the timer 28, moves the bumper bar 81 on that side of the planter to which he is going to turn back so that the gauge 82 reads the same as does the gauge 32, and places a stake in front of said bumper bar 81. He then depresses the foot pedal 30, raising the measuring wheel 14 off of the ground and supports it in this raised position by means of the catch 31. Next he proceeds to turn his tractor and planter around and then places the bumper bar 81 into engagement with the stake which he has just set. Normally he will not have stopped so that the bumper bar 81 is just touching the stake, but rather he will have gone somewhat past so that the bumper bars 81 and hanger 79 have been swung backwardly somewhat by the stake, causing a reading on the gauge 82. The operator then reads the gauge 82 and proceeds to adjust the position of rotation of the measuring wheel 14 so that the gauge 32 on the timer 28 reads the same as the gauge 82. The operator then mounts the tractor and releases the catch 31, thus permitting the measuring wheel 14 to again engage the ground. He is now ready to plant another row. In the event that the planter is not in perfect alignment with the tractor after the operator has turned around at the end of the row and has engaged the stake with the bumper bar 81, in other words if there is a reading other than zero on the gauge 90, it is necessary to compensate for this in adjusting the position of rotation of the measuring wheel 14 when setting the gauge 32. For example, suppose that wheel of the planter which is adjacent the set stake is ahead of the other wheel to an extent such that the reading on the gauge 90 is one; in such a case the operator would set the gauge 32 to read one point less than the gauge 82 because that point will be compensated for when the planter comes into perfect alignment. On the other hand, if the planter wheel adjacent the stake is behind the other planter wheel to an extent such that the reading on the gauge 90 is one, it would be necessary to set the gauge 32 to read one point more than the gauge 82.

As will be obvious from what has been said, as the measuring wheel 14 rotates in non-slipping engagement with the ground, it causes the timer 28 to intermittently cause an electric current to flow through the two circuits in the electrical unit 43 in the manner heretofore described causing actuation of the dropping mechanism as explained. The current continues in the first of the two circuits described in the unit 43 until the switch 41 opens due to the passing of the protuberance 38.

In operating the dropping mechanism of my planter, I excite an electric current; I also rotate a wheel-like member in substantially non-slipping engagement with the ground.

In certain instances, it is desirable to mount the measuring wheel 14 together with the timer 28 and connections on the planter itself rather than upon the tractor. If this is done, it is frequently possible to so position the measuring wheel that it follows in the track of one of the tractor wheels, thus eliminating the necessity for the packing wheel 12. In fact, upon certain types of tractors, it is possible to so position the measuring wheel 14 that it follows in the track of one of the tractor wheels even when said measuring wheel is mounted on the tractor. It is possible to drive the timer 28 or its substitute directly from the measuring wheel 14, thus dispensing with the sprocket wheels 26 and 29 and the chain 27 and eliminating any variations due to lag or slack in the sprockets and chain. The timer 28 may be any suitable means for intermittently causing a current to flow and the measuring wheel 14 and the packing wheel 12 and their supports and connections may be of any suitable nature and size and not necessarily the precise ones described herein for illustrative purposes. Any other suitable electrical unit may be substituted for my unit 43 and numerous structural variations and omissions may be made in my unit 43 without departing from its basic principle. The specific timer 28-electromagnetic unit 43 combination for providing rapid actuation of the dropping mechanism may be replaced by other suitable structure. The connectors and their arrangement by which the unit 43 operates the dropping mechanism may obviously be altered. The hook 85 may be varied as may also the bumper bars 81, the gauge 82 and their supports and connectors. In fact, these members may be omitted and other measuring means employed for determining the proper setting of the timer 28. Clearly the various gauges and controls may be varied or even omitted. I have described my invention as though the electric current was operating to open the dropping mechanism. Obviously the electric current could hold the dropping means closed against a resistance which operates to open the dropping means when the current is cut off. Many of the devices which I have shown in my invention may be employed elsewhere as well as on planters.

I have described my invention in connection with a specific embodiment for illustrative purposes, but inasmuch as it is clear that one skilled in the art will be able to make numerous variations and modifications and this without departing from the spirit and scope of my invention, I wish to be limited herein only by the appended claims.

I claim:

1. In a control for the dropping mechanism of a planter, a timer or mechanism for intermittently causing an electric current to flow comprising a rotatable shaft, a driven means locked to one portion of said shaft, a gauge device adjustable about said shaft, a means for locking said gauge with said shaft, a housing, an electric switch within said housing connected into an electric circuit, and a protuberance on said shaft capable of intermittently operating said switch.

2. In a control for the dropping mechanism of a planter, an electric unit including an electric circuit having electromagnetic means therein, a second electrical circuit having an electromagnet therein adapted to actuate said dropping mechanism, means for causing said electromagnetic means to complete the said second circuit, means for causing the electromagnet in said second circuit to break said second circuit, and means for causing said electromagnetic means to maintain said second circuit broken after current has ceased to flow in the electromagnet in said second circuit.

3. In a control for the dropping mechanism of a planter, a measuring wheel, means for packing the ground ahead of said measuring wheel, a means for intermittently causing an electric current to flow operated by said measuring wheel, indicating means on said means for intermittently causing an electric current to flow, electromagnetic means for at least indirectly operating the dropping mechanism, electrical connections between said electromagnetic means and said means for intermittently causing an electric current to flow, and means for indicating position with reference to a point on the ground whereby proper adjustment of second said means may at times be effected.

4. In a seed dispenser, a timer comprising a housing, a rotatable shaft at least a portion of which is received in said housing, electrical contact points within said housing adapted to be intermittently closed as said shaft is rotated, means for rotating said shaft and adjustable scale and pointer means on said shaft and housing.

5. In a seed dispenser, an elongated member pivotally mounted adjacent one of its ends, a measuring wheel rotatably mounted on said elongated member, timing mechanism mounted on said elongated member, means for operatively connecting said measuring wheel to said timing mechanism, means for yieldably urging said elongated member in one direction of rotation about its pivot, and means for selectively rotating said elongated member in the opposite direction of rotation on said pivot against the resistance of said yieldable means.

6. In a seed dispenser having means for indicating horizontal position, a bar pivotally mounted on said indicating means adapted to be selectively disposed in a generally horizontal plane and in a generally vertical plane.

7. In a seed dispenser, means for indicating horizontal position comprising a pivotally mounted vertical structure, a member pivotally mounted adjacent the lower portion of said vertical structure adapted to be selectively positioned in a generally vertical plane and in a generally horizontal plane and a scale and pointer one of which is operatively connected to said pivotally mounted vertical structure and the other of which is stationarily mounted.

8. In a seed dispenser having dropping mechanism, electrically operated means for intermittently actuating said dropping mechanism, timing apparatus for controlling said electrical actuating means, and a wheel other than a load wheel of said seed dispenser adapted to rotate in contact with a field and to propel said timing apparatus.

9. In a seed dispenser having electrically operated dropping mechanism, a timer adapted to control said electrically operated dropping mechanism, a measuring wheel adapted to rotate in contact with the ground, a sprocket wheel operatively connected to said measuring wheel, a sprocket wheel operatively connected to said timer and a drive chain operatively connecting said sprocket wheels whereby frequency of actuation of said dropping mechanism may be controlled by varying the ratio of the said sprocket wheels.

10. In a control for the dropping mechanism of a seed dispenser, electrical structure including an electric circuit having electromagnetic means therein, a second electrical circuit having an electromagnet therein adapted to actuate said dropping mechanism, means for causing said electromagnet to break said second circuit, and means for causing said electromagnetic means in first said circuit to maintain said second circuit broken after current has ceased to flow in the electromagnet in said second circuit.

11. In a control for the dropping mechanism of a seed dispenser, electrical structure including an electrical circuit, a second electrical circuit having an electromagnet therein adapted to actuate said dropping mechanism, an electromagnet in first said electrical circuit adapted to close said second circuit, means for causing the electromagnet in said second circuit to break said second circuit, a second electromagnet in first said circuit adapted to maintain said second circuit broken after current has ceased to flow in the electromagnet in said second circuit and a timer adapted to control flow of current in both of said circuits.

12. In a seed dispenser dropping mechanism, an electrical circuit containing an electromagnet adapted to actuate said dropping mechanism and adapted also to break the electrical circuit in which it is contained, a second electrical circuit containing an electromagnet adapted to maintain first said circuit broken after current has ceased to flow in first said electromagnet and timing means for controlling said electrical circuits.

13. In a seed dispenser having dropping mechanism, a measuring wheel, means for intermittently causing an electric current to flow, operated by said measuring wheel, indicating means on said means for intermittently causing an electric current to flow, electro-magnetic means for at least indirectly operating the dropping mechanism and electrical connection between said magnetic means and means for intermittently causing an electric current to flow.

14. In a seed dispenser having dropping mechanism, a measuring wheel, means for intermittently causing an electric current to flow operated by said measuring wheel, indicating means on said means for intermittently causing an electric current to flow, electro-magnetic means for at least indirectly operating the dropping mechanism, electrical connection between said electro-magnetic means, and said means for intermittently causing an electric current to flow, and means for indicating position with reference to a point on the ground whereby proper adjustment of first said means may at times be effected.

15. In a seed dispenser having dropping mechanism, a measuring wheel, means for intermittently causing an electric current to flow, operated by said measuring wheel, indicating means on said means for intermittently causing an electric current to flow, the construction being such that said means for intermittently causing an electric current to flow may be manually adjusted to various readings of said indicating means, electro-magnetic means for at least indirectly operating the dropping mechanism and electrical connection between said magnetic means and means for intermittently causing an electric current to flow.

16. In a seed dispenser having dropping mechanism, a measuring wheel, means for intermittently causing an electric current to flow operated by said measuring wheel, indicating means on said means for intermittently causing an electric current to flow, the construction being such that said means for intermittently causing an electric current to flow may be manually adjusted to various readings of said indicating means, electro-magnetic means for at least indirectly operating the dropping mechanism, electrical connection between said electro-magnetic means and said means for intermittently causing an electric current to flow, means for indicating position with reference to a point on the ground and means for indicating the position of said seed dispenser relative a connected vehicle, said latter two means constituting facilities whereby proper adjustment of first said means may at times be effected.

17. In a seed dispenser having dropping mechanism, a measuring wheel, means for providing a path for said measuring wheel, means for intermittently causing an electric current to flow operated by said measuring wheel, indicating means on said means for intermittently causing an electric current to flow, the construction being such that said means for intermittently causing an electric current to flow may be manually adjusted to various readings of said indicating means, electromagnetic means for at least indirectly operating the dropping mechanism, electrical connections linking said electromagnetic means with said means for intermittently causing an electric current to flow, means for reducing the otherwise normal period of current flow in said electromagnetic means to an extent such that it is appreciably shorter than a period during which said means for intermittently causing an electric current to flow causes a current to flow, means for indicating position with reference to a point on the ground, means for indicating the position of said seed dispenser relative a connected vehicle, said latter two means constituting facilities whereby proper manual adjustment of said means for intermittently causing an electric current to flow may at times be effected, and means for supporting an end of a measuring line in alignment with the junctures at which seed is emitted from said seed dispenser enabling said indicating means to be initially properly set.

18. In the process of operating a planter including a measuring wheel, a gauge operatively connected thereto and at least one seed dispensing shoe, the steps, after turning around at the end of a row, of bringing the planter to a halt after heading back across the field, measuring the distance between the line of the seed dispensing shoe and a line passing through a point spaced a multiple of the standard planting interval from a hill planted in the preceding traversing of the field said line being the one of such lines which is next adjacent to said shoe to the rearward thereof and adjusting the position of rotation of said measuring wheel so that the said gauge exhibits a corresponding reading.

19. In the process of operating a planter including a measuring wheel, a gauge operatively connected to said measuring wheel, at least one seed dispensing shoe and a vehicle for propelling said planter, the steps, after turning around at the end of a row, of bringing the planter to a halt after heading back across the field, measuring the distance between the line of the seed dispensing shoe and a line passing through a point spaced a multiple of the standard planting interval from a hill planted in the preceding traversing of the field, said line being the one of such lines which is next adjacent to said shoe to the rearward thereof, compensating said distance by any misalignment between said planter and said propelling vehicle and adjusting the position of rotation of said measuring wheel so that the said gauge exhibits a corresponding reading.

20. In combination a planter, a vehicle connected to said planter, timing mechanism for regulating the functioning of said planter and a gauge for indicating alignment between said planter and said connected vehicle for use in determining the proper setting of said timing mechanism at the commencement of a row of planting, said gauge comprising a scale and registering pointer supported one on said planter and the other on the said connected vehicle.

21. In combination, a planter, timing mechanism for regulating the functioning of said planter and an indicating structure for showing the horizontal position of a particular portion of said planter for use in determining a proper setting for said timing mechanism at the commencement of a row of planting, said indicating structure comprising a pivoted vertical bar, and a scale and a pointer, one of which is operatively connected to said vertical bar to one side of the pivot point thereof and the other of which is stationarily mounted.

22. In combination, a planter, timing mechanism for regulating the functioning of said planter and an indicating structure for showing the horizontal position of a particular portion of said planter for use in determining a proper setting for said timing mechanism at the commencement of a row of planting.

23. In combination a planter, a vehicle connected to said planter, timing mechanism for regulating the functioning of said planter and a gauge for indicating alignment between said planter and said connected vehicle for use in determining the proper setting of said timing mechanism at the commencement of a row of planting.

24. In combination a planter, a vehicle connected to said planter, timing mechanism for regulating the functioning of said planter, a gauge for indicating the alignment between said planter and said connected vehicle, and a second gauge for indicating the horizontal position of a particular portion of said planter, both of said gauges being for use in determining a proper setting for said timing mechanism at the commencement of a row of planting.

JAMES RUSSELL WILCOX.

REFERENCES CITED

The following references are of record in the file of this patent:

UNITED STATES PATENTS

| Number | Name | Date |
| --- | --- | --- |
| 148,246 | Risch | Mar. 3, 1874 |
| 159,454 | Roark | Feb. 2, 1875 |
| 330,724 | Montgomery | Nov. 17, 1885 |
| 481,852 | Dougherty | Aug. 30, 1892 |
| 595,187 | Mahon et al. | Dec. 7, 1897 |
| 995,225 | Crisman | June 13, 1911 |
| 1,252,923 | Moench | Jan. 8, 1918 |
| 1,751,263 | Casareo | Mar. 18, 1930 |
| 1,948,559 | Bohmker | Feb. 27, 1934 |
| 1,964,465 | Haas | June 26, 1934 |
| 2,023,053 | Kugel | Dec. 3, 1935 |
| 2,093,582 | Uehling | Sept. 21, 1937 |
| 2,122,078 | Williams | June 28, 1938 |
| 2,329,659 | Smith | Sept. 14, 1943 |